UNITED STATES PATENT OFFICE.

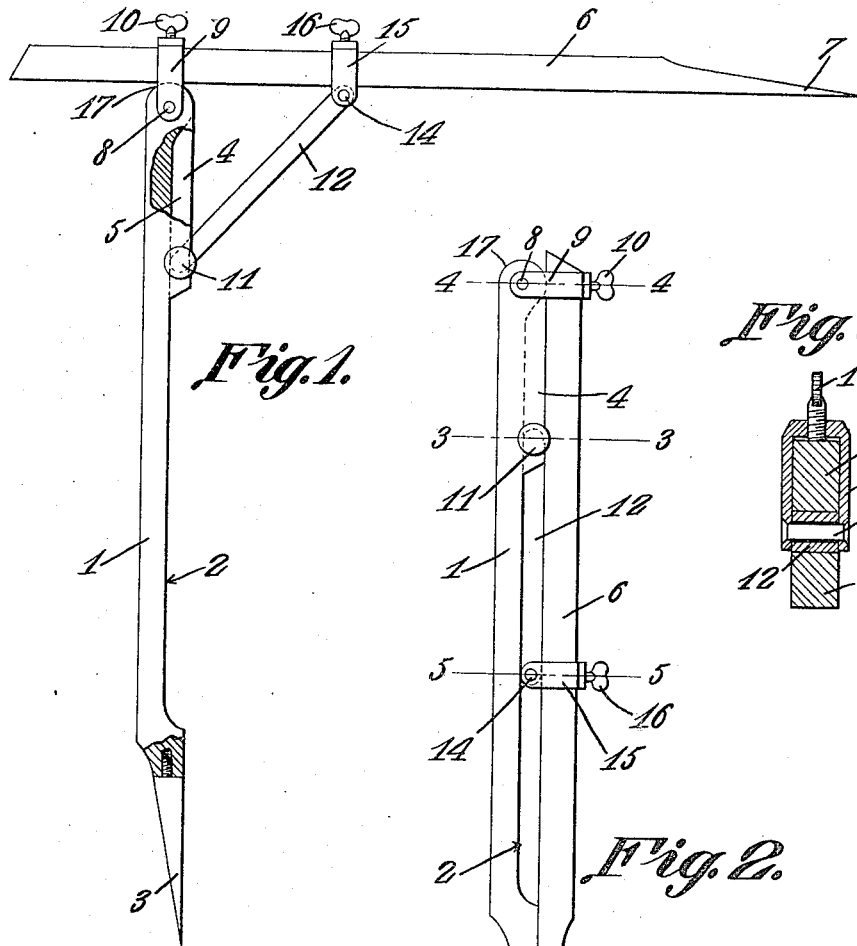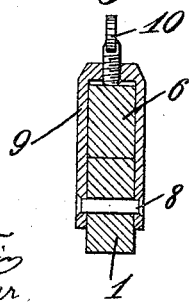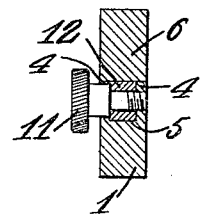

WILLIAM HOLMES, OF BELPRE, OHIO.

COMBINATION-TOOL.

1,195,471. Specification of Letters Patent. Patented Aug. 22, 1916.

Application filed March 21, 1916. Serial No. 85,546.

*To all whom it may concern:*

Be it known that I, WILLIAM HOLMES, a citizen of the United States, residing at Belpre, in the county of Washington and State of Ohio, have invented a new and useful Combination-Tool, of which the following is a specification.

The device forming the subject matter of this application is a combination tool adapted to be used as a compass, a pair of dividers, a bevel and a square.

The invention aims to provide novel means for operatively connecting the main and auxiliary legs of the tool, so that the tool may be employed for the purposes above indicated.

It is within the scope of the disclosure to improve generally and to enhance the utility of devices of that type to which the present invention appertains.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings:—Figure 1 shows in side elevation, a tool constructed in accordance with the present invention, the legs being disposed at an angle to each other, and portions of the main leg being broken away; Fig. 2 is an elevation wherein the legs of the tool are shown closed together; Fig. 3 is a cross section on the line 3—3 of Fig. 2; Fig. 4 is a cross section on the line 4—4 of Fig. 2; and Fig. 5 is a cross section on the line 5—5 of Fig. 2.

The tool forming the subject matter of this application preferably is made of metal throughout and embodies a main leg 1 which is rounded at one end as shown at 17. In the inner edge of the main leg 1 there is fashioned a recess 2. The main leg 1 terminates in a point 3 which may be detachable if desired. The main leg 1 adjacent its rounded end 17 and upon its inner edge is provided with spaced ears 4 forming a longitudinal slot 5. The invention includes an auxiliary leg denoted by the numeral 6, the leg 6 terminating in a point 7 adapted to coöperate with the point 3 of the main leg 1 when the tool is used as a compass or as a pair of dividers.

By means of a pivot element 8, a loop 9 is connected with one end of the leg 1. Threaded into the loop 9 is a set screw 10. A clamp screw 11 is journaled in one of the ears 4 and is threaded into the other of the said ears. The clamp screw 11 forms a pivotal mounting for one end of a link 12, the other end of which is united by means of a pivot element 14 with a loop 15. Threaded into the loop 15 is a set screw 16. The auxiliary leg 6 is mounted in the loops 9 and 15 for longitudinal adjustment, and may be held in adjusted positions by tightening up the set screws 10 and 16.

When it is desired to use the tool as a compass or as a pair of dividers, the set screw 16 is loosened, the loop 9 swinging on the pivot element 8. The legs 6 and 1 then may be separated to any desired extent, the loop 15 sliding along the leg 6. The loop 15 may be held in adjusted positions by tightening the set screw 16, whereupon the link 12 will hold the legs 6 and 1 at any desired angle. By loosening the set screws 10 and 16, the leg 6 may be moved endwise to project to any desired extent to the left of the leg 1, as shown in Fig. 1. The structure under such circumstances may be used as a square or bevel. The clamp screw 11 may be tightened up at any time to hold the link 12 against swinging movement with respect to the leg 1. The slot 5 in the leg 1 serves to receive a portion of the link 12 when the legs 6 and 1 stand at an obtuse angle with respect to each other.

Having thus described the invention, what is claimed is:—

1. In a combined compass and bevel, a main leg; a link pivoted to the main leg intermediate the ends of the main leg; a pivot means on the main leg; a pivot means on the link; an auxiliary leg longitudinally movable on the pivot means; and mechanism for holding the auxiliary leg against longitudinal movement with respect to the pivot means.

2. In a combined compass and bevel, a main leg; a loop pivoted to one end of the main leg; a link one end of which is pivoted to the main leg intermediate the ends of the main leg; a loop pivoted to the other end of the link; an auxiliary leg longitudinally adjustable in both loops; and clamping means carried by the loops and coöperating with the auxiliary leg.

In testimony that I claim the foregoing as my own, I have hereto affixed my signature in the presence of two witnesses.

WILLIAM HOLMES.

Witnesses:
 JAMES KITTS MILLER,
 C. L. BEAN.